(12) United States Patent
Johnson

(10) Patent No.: US 8,074,159 B2
(45) Date of Patent: *Dec. 6, 2011

(54) METHOD AND APPARATUS FOR DETECTING COMMUNICATION ERRORS ON A BUS

(75) Inventor: Christopher S. Johnson, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/823,347

(22) Filed: Jun. 25, 2010

(65) Prior Publication Data

US 2010/0262872 A1    Oct. 14, 2010

Related U.S. Application Data

(63) Continuation of application No. 11/186,713, filed on Jul. 21, 2005, now Pat. No. 7,747,933.

(51) Int. Cl.
*G06F 11/00* (2006.01)
*G08C 25/00* (2006.01)
*H03M 13/00* (2006.01)
*H04L 1/00* (2006.01)

(52) U.S. Cl. .................. 714/799; 714/768; 711/112

(58) Field of Classification Search ........... 711/112; 716/17; 714/768, 799
See application file for complete search history.

(56) References Cited

U.S. PATENT DOCUMENTS

| | | |
|---|---|---|
| 4,639,917 A | 1/1987 | Furuta |
| 5,155,735 A | 10/1992 | Nash et al. |
| 5,173,905 A | 12/1992 | Parkinson et al. |
| 5,339,322 A | 8/1994 | Rastegar |
| 5,355,377 A | 10/1994 | Venkidu et al. |
| 5,606,662 A | 2/1997 | Wisor |
| 5,719,890 A | 2/1998 | Thomann et al. |
| 5,778,007 A | 7/1998 | Thomann et al. |
| 5,872,802 A | 2/1999 | Knaack et al. |
| 6,125,454 A | 9/2000 | Mossner et al. |
| 6,125,466 A | 9/2000 | Close et al. |
| 6,185,718 B1 | 2/2001 | Dell et al. |
| 6,260,089 B1 | 7/2001 | Imming |
| 6,314,550 B1 | 11/2001 | Wang et al. |
| 6,317,417 B1 | 11/2001 | Childs et al. |
| 6,414,688 B1 | 7/2002 | Jeddeloh |
| 7,293,221 B1 | 11/2007 | Wong et al. |
| 2002/0018389 A1 | 2/2002 | Ito et al. |
| 2007/0033512 A1 | 2/2007 | Johnson |

OTHER PUBLICATIONS

"Micron, Graphics DDR3 SDRAM," Micron Technology, Inc., 2003, pp. 1-66.

*Primary Examiner* — Sam Rizk
(74) *Attorney, Agent, or Firm* — TraskBritt

(57) ABSTRACT

A semiconductor memory includes multi-mode reporting signals, a state register, and parity detectors. The parity detector determines whether signals received on a communication bus contain a desired parity. The multi-mode reporting signals enable reporting of communication faults without adding additional signals to the semiconductor memory by being configured in a normal operating mode or a parity fault mode for reporting communication faults to an external memory controller. The state register enables storing of received values from the communication bus. With the state register, a memory controller may determine correctly received signal patterns and failing signal patterns. Parity may be defined as even or odd and may be generated based on various signal configurations. The invention may be configured as a computing system comprising a processor, an input device, an output device, the memory controller, and at least one semiconductor memory.

26 Claims, 2 Drawing Sheets

METHOD AND APPARATUS FOR DETECTING COMMUNICATION ERRORS ON A BUS

This application is a continuation of application Ser. No. 11/186,713, filed Jul. 21, 2005, now U.S. Pat. No. 7,747,933, issued Jun. 29, 2010. The disclosure of the previously referenced U.S. patent application is hereby incorporated by reference in its entirety.

BACKGROUND OF THE INVENTION

1. Field of the Invention

The present invention relates generally to semiconductor integrated circuits and, in particular, to error detection and remedial measures in the context of integrated circuits transmitting and receiving multi-bit address and data information.

2. Description of Related Art

Encoders and Decoders for detection and correction of data errors have long been used in integrated circuits, particularly in Dynamic Random Access Memories (DRAMs), which may be susceptible to data storage errors. Methods of parity generation, storage, and checking have often been implemented in an attempt to discover where and when storage errors occur. Generally, parity is defined as the calculation of a number of asserted signals, or bits, in a collection of signals generally referred to as a bus. Typically, a "1" is considered the asserted state. In a characteristic application, a data byte containing 8 bits may be used as the base collection. As an example, if the data byte has the value "1100 1011" five bits contain the value of "1" and three bits contain the value of "0." To track the parity of a data byte, an additional bit may be added to the byte to indicate the parity of the byte. In this case, if odd parity is desired, the parity bit is placed in the appropriate state to make the total number of asserted bits in the collection of bits including the data byte and the parity bit an odd number. Therefore, for the case of five asserted bits in the data byte, the parity bit is de-asserted to keep the total number of asserted bits odd. If, as another example, the data byte contains two asserted bits, the odd parity bit is asserted to make the total number of asserted bits in the combination of the data byte and the parity bit an odd number, namely three in this case. Parity may also be generated and checked as even parity. In even parity, the parity bit is asserted or de-asserted to make the total number of asserted bits in the collection of the data byte and parity bit equal to an even number.

In many conventional memory systems containing parity for the detection of storage errors, the additional parity bit is stored in memory along with the data byte requiring 9 bits of memory storage for each byte of data. With this extra storage bit, if the data byte and parity are stored with odd parity, when the read occurs a check is performed to verify that odd parity is present on the read data. If not, then an error has occurred in either storage or retrieval of the data.

Additionally, systems have been developed to check that an address, or other signals, communicated from a transmitter to a receiver are received correctly. In the case of address signals, detecting and possibly attempting to correct address errors is important to prevent data from being read or written to the wrong storage location. In these address fault detection systems error detection is desired for the transmission of signals, not storage. Therefore, there is no need to store the parity bit(s). Instead valid parity is generated at the transmission end, the parity and data signals are transmitted, and a check is performed to ensure that valid parity is still present at the receiving end. In addition, using additional bits beyond the parity bit, error correction codes can be combined with the parity bit. The error correction codes accompany the transmission of data and parity, allowing correction of certain errors at the receiving end that may occur in transmission. One approach to dealing with this problem of signal transmission errors and correction techniques is seen in U.S. Pat. No. 5,173,905 to Parkinson et al.

As the need for higher speed and bandwidth to memory increases, engineers push closer to the speed and signaling boundaries where transmission errors may occur. Signals between modern semiconductor devices may have very low voltage swings or may be configured as current mode signals. The smaller voltage swings reduce the acceptable margin of error even with more precise input signal level sensors. Also, pushing the signal transmissions to higher speeds means that a shorter time period exists when the signal is in a steady state of a high or a low when it can be sensed before the signal makes a transition to the next state. Computer graphics controllers and the graphics DRAMs used in graphics memory systems are particularly high consumers of memory bandwidth and therefore vulnerable to signal transmission errors.

As a result, there is a need for simple low cost detection of signal transmission and reception errors on high speed buses, particularly graphics buses, to allow for remedial measures to be taken. Additionally, there is a need to perform this operation without adding additional Input/Output (IO) signals to devices already under severe signal count constraints.

BRIEF SUMMARY OF THE INVENTION

One embodiment of the invention comprises a semiconductor memory comprising at least one multi-mode reporting signal, a state register, and a parity detector for determining if a set of signals received on a communication bus contains a desired parity. The multi-mode reporting signal enables reporting of communication faults without adding additional signals to the semiconductor memory. The multi-mode reporting signal may be configured in a normal operational mode, or it may be configured in a fault reporting mode for signaling the communication fault to an external device. An external device, such as a memory controller or graphics memory controller, may place the multi-mode reporting signal in the fault reporting mode by writing to an enable unit within the semiconductor memory.

Additionally, the state register enables the storing of received values from the communication bus. This storing of received values allows an external memory controller to read the state register to determine which signals were received incorrectly. With the state register, an external device may determine what type of signal patterns are received correctly and what type of signal patterns may fail. In this error detection system, parity may be defined as even or odd. Also, parity may be generated based on various signal collections depending upon the type of signals present on the communication bus and the desired data patterns to be placed on the bus.

Another embodiment of the invention comprises a system including a memory controller and at least one semiconductor memory. In this embodiment, the memory controller may generate the proper parity for the set of signals on the communication bus and transmit the signals and parity to the at least one semiconductor memory. The at least one semiconductor memory then checks for expected parity and stores the received signal values in the state register. If a parity fault is detected and the at least one semiconductor memory is configured to report the fault, the fault is indicated to the memory controller. The memory controller may then read the state register in the at least one semiconductor memory to determine which signal was not received correctly. As a result of the determination, the memory controller may then attempt to modify various transmission characteristics in an attempt to remedy the faulty communication.

Yet another embodiment of the invention comprises a computing system including a processor, at least one input device, at least one output device, the memory controller, and at least one semiconductor memory. In this embodiment, the memory controller may physically be separate from the processor or may be on the same semiconductor device as the processor.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
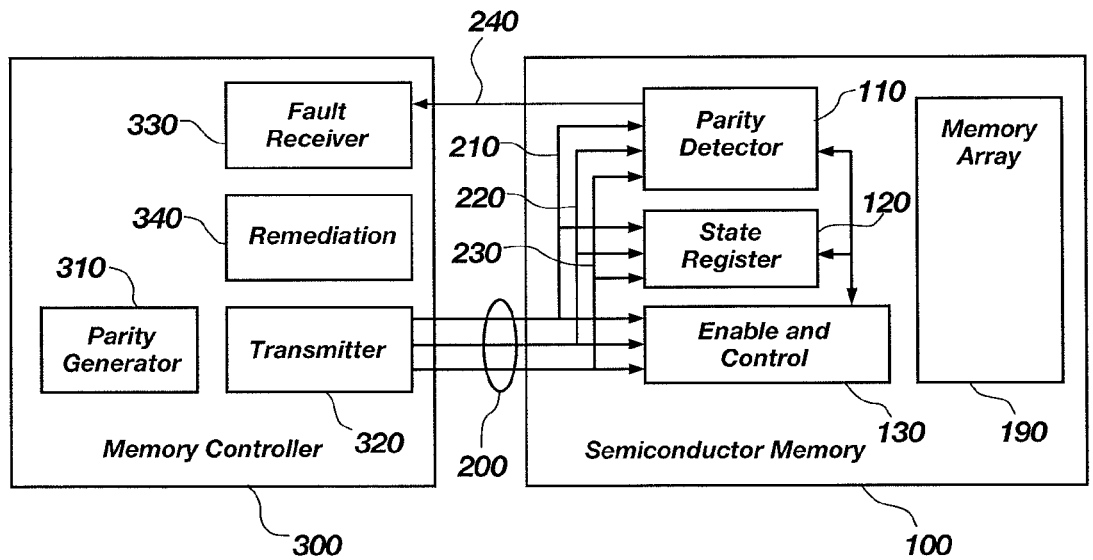
FIG. 1 is a block diagram of a system comprising a memory controller and a semiconductor memory connected by a communication bus.

In one embodiment of the invention, depicted in FIG. 1, a memory controller 300 is connected to a semiconductor memory 100 by a communication bus 200. The semiconductor memory 100 contains a conventional memory array 190 with all the associated addressing logic, reading logic, and writing logic required to access the memory array 190. In addition, the semiconductor memory 100 contains modules for detecting, storing, and reporting communication faults.

For detecting the communication faults, a parity detector 110 is connected to the communication bus 200. A parity fault may be reported if the received parity does not match a desired parity. The desired parity may be configured as even or odd parity. As described previously, parity is defined as the calculation of a number of asserted signals, or bits, in a collection of signals generally referred to as a bus. In a characteristic application, a data byte containing 8 bits may be used as the base collection. As previously noted, if the data byte has the value "1100 1011" five bits contain the value of "1" and three bits contain the value of "0." For odd parity, the parity bit is de-asserted to make the total number of asserted signal in the combination of the data byte and parity bit equal to an odd number. On the other hand, for even parity, the parity bit is asserted to make the total number of asserted signal in the combination of the data byte and parity bit equal to an even number. This is a simple example of a typical parity implementation for a single data byte. The present invention comprises many more signals in more flexible parity arrangements.

Figure 2:
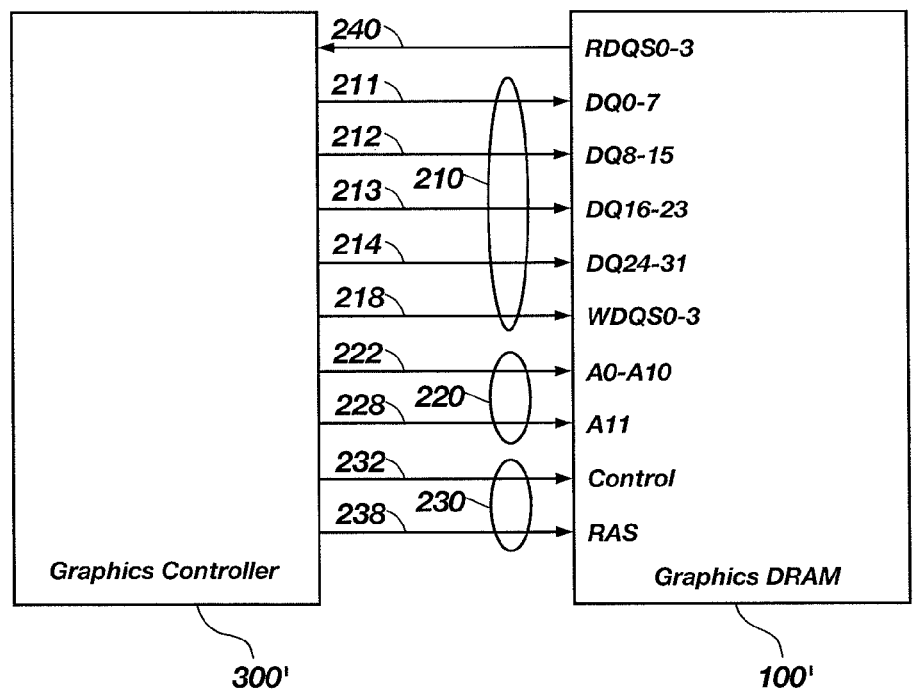
FIG. 2 is a block diagram showing details of the communication bus in an exemplary implementation using a graphics DRAM.

FIG. 2 shows an exemplary embodiment of the invention using a graphics memory controller 300' and graphics DRAM 100'. Typical address, data, and control signals are shown for a 256 Megabit graphics synchronous DRAM 100' with a 32 bit wide data bus. When the semiconductor memory 100 is placed into the parity detection mode, various signal partitioning is possible and various signals may be used as the parity bit. For example, in a straightforward implementation, the signals may be logically segmented in to a data portion 210, an address portion 220, a control portion 230, and a parity portion defined as a logical collection of all the parity bits for all the defined portions.

In this straightforward partitioning, it may be desirable to separate each of the four data bytes (211, 212, 213, and 214) into separate parity checking collections. The parity bit associated with each data byte (211, 212, 213, and 214), while in the parity checking mode may be, for example, the write enable signals 218 for each byte, denoted in FIG. 2 as Write Data Strobes (WDQS0-3). Additionally, the address portion 220 may be defined as the address signals 222 denoted as A0-A11. Any one of the address signals 222 may be selected as the address parity bit 228. In this embodiment, A11 is selected as the address parity bit 228. Finally, the control portion 230 may be defined as any additional signals required for control of the memory device. A non-exhaustive list of these type of signals may be signals typical of any DRAM or graphics DRAM 100' well known to those skilled in DRAM design such as; Row Address Strobe (RAS), Column Address Strobe (CAS), Write Enable (WE), Chip Select (CS#), Clock Enable (CKE#), input Data Masks (DM0-3), and Bank Addresses (BA0-1). In a control portion 230 such as this, any signal may be chosen as the control parity bit 238. For the implementation shown in FIG. 2, RAS is selected as the control parity bit 238.

Many other collections are contemplated within the scope of the invention. For example, the data bytes (211, 212, 213, and 214) may be organized into 16 bit words with one parity bit. In this configuration, as an example, WDQS0 may be associated with the 16 bit word containing data byte zero 211 and data byte one 212. WDQS2 may be associated with the 16 bit word containing data byte two 213 and data byte three 214. In another configuration for the data portion, the entire data bus may be configured with a single data parity bit such as WDQS0. Similarly, the address portion 220 may contain additional signals such as the bank addresses BA0-1. In this address portion 220 configuration it may be desirable to designate BA0 as one address parity bit 228 and BA1 as an additional address parity bit 228. The address bus may then be split into two portions, such as A0-A5 as one portion with BA0 as a first address parity bit 228 and A6-A11 as the other portion with BA1 as a second address parity bit 228. Yet another configuration may move the Data Mask signals DM0-3, from the control portion 230 to the data portion 210 either as data bits or possibly as data parity bits. It will be clear to a person skilled in the art that many different combinations are possible. Additionally, allowing configuration in different modes is desirable for flexibility in analysis of communication faults.

Reporting the communication fault is performed by at least one multi-mode reporting signal 240. In the exemplary embodiment shown in FIG. 2, the multi-mode reporting signals 240 are implemented as the Read Data Strobes (RDQS0-3) on a graphics DRAM 100'. Implementing a plurality of multi-mode reporting signals 240 allows multiple parity errors to be reported for different signal portions such as the address portion 220, control portion 230, and data portion 210. Segmenting the parity faults this way may assist the memory controller 300 in determining where the communication fault exists. Clearly, a single multi-mode reporting signal 240 is also possible to report a communication fault anywhere on the communication bus 200.

Communication fault reporting may be disabled. When communication fault reporting is disabled, by writing to a control register in the graphics DRAM 100', the multi-mode reporting signal 240 is configured to perform its normal operational function. Additionally, when the system is configured to operate in a normal, non-parity mode, the address, data, and control signals designated as parity bits may be configured, in the memory controller 300, to perform normal operational functions rather than performing the parity bit function.

However, if detection of communication faults is desired, the multi-mode reporting signal 240 may be placed in a fault reporting mode whereby the multi-mode reporting signal 240 is asserted whenever a communication event contains a parity error. As long as communication events are received with proper parity, the multi-mode reporting signal 240 will remain de-asserted. The assertion level of the multi-mode reporting signal 240 in the fault reporting mode may be defined as high or low depending on the system application and requirements of the memory controller 300.

To track where and when a communication fault occurs, a state register 120 (FIG. 1) stores the values of the set of signals on the communication bus 200 for each communication event. The state register 120 may be enabled, by the enable unit 130, to begin collecting communication events independent of whether communication faults are reported on the multi-mode reporting signal 240. When enabled, the state register 120 reloads the state of the communication bus 200 for each communication event until the parity detector 110 detects a communication fault. At the point where a communication fault is detected, storage of further communication events is disabled so that the state register 120 contains the signal values for the faulty communication event. A memory controller 300 may then read the state register 120 to determine which signal was not received correctly. The state register 120 may then be re-armed by the enable unit 130 to collect additional communication events.

If communication event errors are detected, they may be reported to a memory controller 300. The memory controller 300, as shown in FIG. 1, comprises a parity generator 310, a transmitter 320, a fault receiver 330, and a remediation unit 340. When in a mode of checking for communication errors, the parity generator 310 creates proper parity, either even or odd, for the communication bus 200 using the desired partitioning described above. The transmitter 320 sends the data and parity signals on the communication bus 200. When communication faults are detected by the semiconductor memory 100, they may be reported to the fault receiver 330 on the multi-mode reporting signal(s) 240.

If desired, the system comprising a memory controller 300 and semiconductor memory 100 may be configured to attempt remedial measures for repairing communication errors by modifying various transmission characteristics of the communication bus 200. Memory controllers 300 and semiconductor memories 100 typically contain components for modifying the impedance levels of output drivers. Adjusting these impedance levels may help reduce signaling problems such as ringing and overshoot. Some memory buses are configured with current mode outputs. In these systems, in addition to adjusting output impedance, the communication bus 200 may have termination resistors on the signals of the communication bus 200. Adjusting the value of these resistors may reduce signaling problems. Input pins are often configured to sense the switch from a high to low, or low to high, at a specific voltage level supplied by the system. Adjusting this voltage level may reduce communication errors.

Finally, various timing adjustments are possible, such as when various outputs are triggered to switch state. For example, the switching of a plurality of outputs may be staggered such that not all the outputs of the plurality switch at the same time. Also, the various signal types (e.g., data, control, address) may be varied slightly in when they switch relative to each other to assist in timing issues such as input setup and hold problems. Other timing relationships and methods to modify signal transmission characteristics are also within the scope of the present invention.

Figure 3:
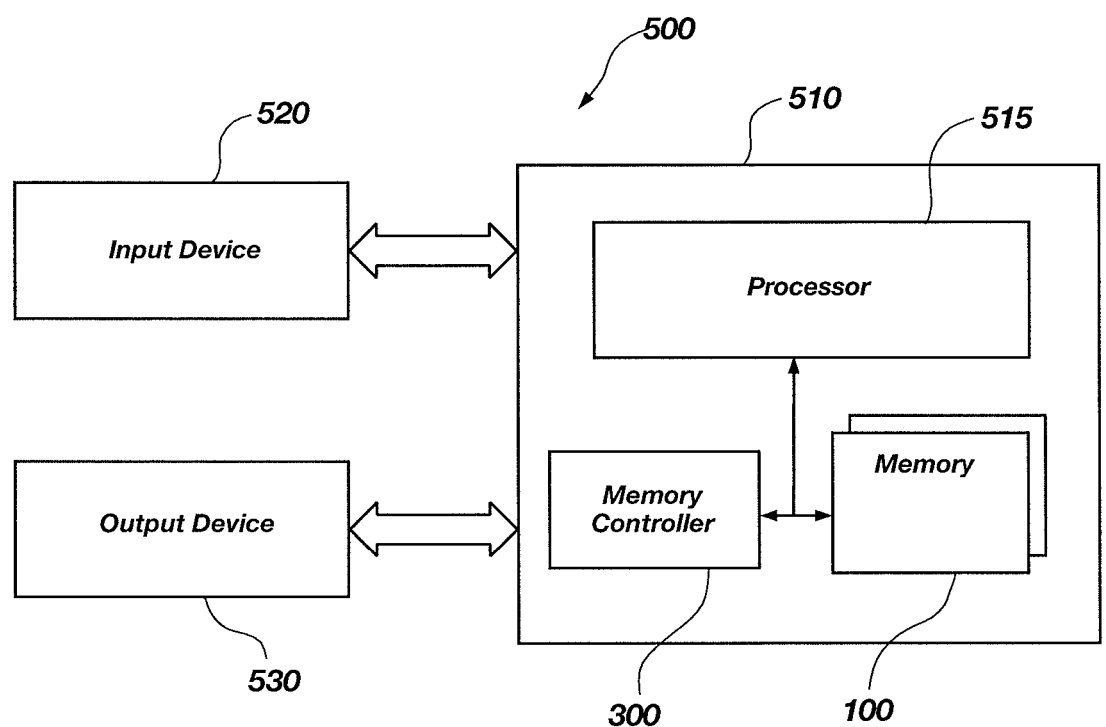
FIG. 3 is a block diagram showing semiconductor memories and a memory controller in a computer system.

Another embodiment of the invention, as shown in FIG. 3, comprises a computer system 500 comprising a processing module 510, at least one input device 520 and at least one output device 530. The processing module 510 comprises a processor 515, a memory controller 300, and at least one semiconductor memory 100 containing the communication fault detection apparatus according to the present invention. In this system, the memory controller 300 may be a standard memory controller 300 or a graphics DRAM controller 300'. Additionally, the memory controller 300 may be configured such that it is physically located within the processor 515 (not shown).

Although this invention has been described with reference to particular embodiments, the invention is not limited to these described embodiments. Rather, the invention is limited only by the appended claims, which include within their scope all equivalent apparatuses and methods that operate according to the principles of the invention as described.

What is claimed is:

1. A method of adjusting a communication bus, comprising:
   receiving a transmission on the communication bus;
   detecting at least one communication fault when a received parity of the communication bus does not match a desired parity;
   reporting the at least one communication fault on at least one multi-mode reporting signal pin, wherein each multi-mode reporting signal pin functions in an operational mode of the communication bus during the receiving and the detecting and functions in a fault reporting mode during the reporting; and
   modifying a reception characteristic of the communication bus in an attempt to eliminate the at least one communication fault wherein the reception characteristic comprises a voltage reference level for inputs on the communication bus.

2. The method of claim 1, wherein the modifying the reception characteristic of the communication bus further comprises modifying a timing delay in receiving the communication bus.

3. The method of claim 1, wherein the modifying the reception characteristic of the communication bus further comprises modifying a timing relationship between different signals of the communication bus.

4. The method of claim 3, wherein the modifying the timing relationship between the different signals further comprises modifying at least one of:
   the timing relationship between a data portion of the communication bus and a control portion of the communication bus;
   the timing relationship between the data portion and an address portion of the communication bus; and
   the timing relationship between the address portion and the control portion.

5. The method of claim 1, further comprising enabling the reporting the at least one communication fault by placing the at least one multi-mode reporting signal pin in the fault reporting mode.

6. The method of claim 1, further comprising disabling the reporting the at least one communication fault by placing the at least one multi-mode reporting signal pin in the operational mode.

7. The method of claim 1, further comprising storing a state of the communication bus during the transmission in a state register for subsequent analysis of the state of the communication bus during the transmission.

8. The method of claim 1, further comprising selecting at least one write enable signal for at least one data byte of the communication bus to be configured as a data parity bit for the at least one data byte.

9. The method of claim 1, further comprising selecting at least one address signal in an address portion of the communication bus to be configured as an address and control parity bit comprising a parity result of a combination of the address portion and a control portion of the communication bus.

10. The method of claim 1, further comprising selecting at least one control signal in a control portion of the communication bus to be configured as an address and control parity bit comprising a parity result of a combination of the control portion and an address portion of the communication bus.

11. A method of adjusting a communication bus, comprising:
    sending a transmission on the communication bus;
    receiving, on at least one multi-mode reporting signal pin, an indication of at least one communication fault determined in response to the transmission, wherein each multi-mode reporting signal pin functions in an operational mode of the communication bus during the sending and functions in a fault receiving mode during the receiving; and
    modifying a transmission characteristic of the communication bus in an attempt to eliminate the at least one communication fault wherein the transmission characteristic comprises an impedance level for a driver on the communication bus.

12. The method of claim 11, further comprising generating at least one parity signal from a set of signals of the communication bus and wherein the sending the transmission further comprises sending the at least one parity signal and the set of signals on the communication bus.

13. The method of claim 11, wherein the modifying the transmission characteristic of the communication bus further comprises modifying a timing delay of the communication bus.

14. The method of claim 11, wherein the modifying the transmission characteristic of the communication bus further comprises modifying a timing relationship between different signals of the communication bus.

15. The method of claim 14, wherein the modifying the timing relationship between the different signals further comprises modifying:
    the timing relationship between a data portion of the communication bus and a control portion of the communication bus;
    the timing relationship between the data portion and an address portion of the communication bus;
    the timing relationship between the address portion and the control portion; or
    a combination thereof.

16. A semiconductor memory, comprising:
    signal pins comprising a communication bus including a capability for modifying a termination resistance of the signal pins responsive to a faulty communication event;
    a parity detector for determining a received parity of the communication bus and the faulty communication event responsive to the received parity; and
    at least one multi-mode reporting signal pin on the semiconductor memory, wherein each multi-mode reporting signal pin has modes configured for different functional operations of the semiconductor memory, the modes comprising:
        a fault reporting mode adapted to indicate the faulty communication event; and
        an operational mode adapted for performing a normal operational function of the communication bus.

17. The semiconductor memory of claim 16, further comprising a state register for storing a state of the communication bus at a time of the faulty communication event for subsequent analysis of the state of the communication bus during the faulty communication event.

18. The semiconductor memory of claim 16, further comprising an enable unit for enabling indication of the faulty communication event by placing the at least one multi-mode reporting signal pin in the fault reporting mode and disabling the indication of the faulty communication event by placing the at least one multi-mode reporting signal pin in the operational mode.

19. The semiconductor memory of claim 16, wherein the at least one multi-mode reporting signal pin, when in the operational mode, is a read byte valid signal.

20. The semiconductor memory of claim 16, wherein the communication bus further comprises:
    a data portion comprising at least one data signal;
    an address portion comprising at least one address signal;
    a control portion comprising at least one control signal; and
    a parity portion comprising at least one parity signal derived from a parity determination of the data portion, the address portion, and the control portion.

21. The semiconductor memory of claim 20, wherein the parity portion comprises at least one write enable signal for at least one data byte in the data portion configured as a data parity bit for the at least one data byte.

22. The semiconductor memory of claim 20, wherein the parity portion comprises one of the at least one address signals in the address portion configured as an address and control parity bit comprising a parity result of a combination of the address portion and the control portion.

23. A memory controller, comprising:
    signal pins comprising a communication bus including a capability for modifying an output impedance of the signal pins responsive to a faulty communication event;
    a parity generator for creating a transmission parity responsive to a set of signals;
    a transmitter for transmitting the set of signals and the transmission parity on the communication bus;
    a fault receiver for receiving a report of at least one communication fault on the communication bus; and
    a remediation unit for attempting to eliminate the at least one communication fault by modifying a transmission characteristic of the communication bus wherein the transmission characteristic comprises the output impedance of at least one of the signal pins.

24. The memory controller of claim 23, wherein the transmission characteristic further comprises a timing delay of at least one of the signal pins.

25. The memory controller of claim 23, wherein the transmission characteristic further comprises a timing relationship between at least two different signal pins.

26. The memory controller of claim 25, wherein the timing relationship between the at least two different signal pins is selected from of the group consisting of:
    the timing relationship between a data portion of the communication bus and a control portion of the communication bus;
    the timing relationship between the data portion and an address portion of the communication bus; and
    the timing relationship between the address portion and the control portion.

* * * * *